(12) United States Patent
Brzezinski et al.

(10) Patent No.: US 10,882,070 B2
(45) Date of Patent: Jan. 5, 2021

(54) METHOD OF MANUFACTURING A STEERING SHAFT ASSEMBLY

(71) Applicant: STEERING SOLUTIONS IP HOLDING CORPORATION, Saginaw, MI (US)

(72) Inventors: Gregory D. Brzezinski, Freeland, MI (US); Terry E. Burkhard, Bay City, MI (US); Chase A. Szostak, Saginaw, MI (US); Harold J. Nelson, Standish, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 150 days.

(21) Appl. No.: 15/470,996

(22) Filed: Mar. 28, 2017

(65) Prior Publication Data
US 2018/0281129 A1 Oct. 4, 2018

(51) Int. Cl.
*B05D 1/22* (2006.01)
*B23P 19/10* (2006.01)
*B23P 11/00* (2006.01)
*B62D 1/16* (2006.01)
*B62D 1/20* (2006.01)

(52) U.S. Cl.
CPC ............. *B05D 1/22* (2013.01); *B23P 11/00* (2013.01); *B23P 19/10* (2013.01); *B62D 1/16* (2013.01); *B62D 1/20* (2013.01); *B23P 2700/50* (2013.01)

(58) Field of Classification Search
CPC .. B05D 1/22; B23P 11/00; B23P 19/10; B23P 2700/50; B62D 1/16; B62D 1/20
See application file for complete search history.

(56) References Cited

U.S. PATENT DOCUMENTS

| | | |
|---|---|---|
| 2,453,949 A | 11/1948 | Ulinski |
| 4,981,049 A | 1/1991 | Venable et al. |
| 5,138,766 A * | 8/1992 | Kimura .............. B29D 99/0035 29/895.212 |
| 6,095,690 A | 8/2000 | Niegel et al. |
| 6,739,238 B2 | 5/2004 | Ushijima et al. |
| 7,048,972 B2 | 5/2006 | Kitahata et al. |
| 8,123,413 B2 | 2/2012 | Tambe et al. |
| 8,262,484 B2 | 9/2012 | Nakatani et al. |
| 8,337,315 B2 | 12/2012 | Ando et al. |
| 8,382,159 B2 | 2/2013 | Tanaka et al. |
| 8,419,555 B2 | 4/2013 | Tokioka |
| 8,753,215 B2 | 6/2014 | Tokioka |
| 9,005,038 B2 | 4/2015 | Nabeshima et al. |
| 9,010,215 B2 | 4/2015 | Rietzler |
| 9,217,196 B2 | 12/2015 | Ando et al. |
| 9,566,998 B2 | 2/2017 | Kurokawa |
| 9,618,052 B2 | 4/2017 | Miyake |
| 9,658,132 B2 | 5/2017 | Gallimore et al. |
| 9,707,910 B2 | 7/2017 | Kakita et al. |
| 2006/0181069 A1 | 8/2006 | Yamada |
| 2011/0030496 A1* | 2/2011 | Tokioka .................. F16C 3/035 74/492 |

(Continued)

*Primary Examiner* — Christopher M Koehler
(74) *Attorney, Agent, or Firm* — Dickinson Wright, PLLC

(57) ABSTRACT

A method of manufacturing a steering shaft assembly includes heating an inner shaft and heating an outer shaft. The method also includes applying a plastic coating to at least a portion of the inner shaft. The method further includes cooling the plastic coating and pressing the outer shaft and the inner shaft together.

10 Claims, 2 Drawing Sheets

(56) References Cited

U.S. PATENT DOCUMENTS

| | | |
|---|---|---|
| 2012/0080258 A1 | 4/2012 | Tokioka |
| 2016/0102185 A1 | 4/2016 | Topolkaraev et al. |
| 2016/0121523 A1 | 5/2016 | Topolkaraev et al. |
| 2016/0153500 A1 | 6/2016 | Miyake |
| 2016/0257850 A1* | 9/2016 | Nishida .................. C09D 5/03 |
| 2017/0232995 A1 | 8/2017 | Brzezinski |

* cited by examiner

METHOD OF MANUFACTURING A STEERING SHAFT ASSEMBLY

BACKGROUND OF THE INVENTION

Telescoping steering columns may include an injection molded plastic telescope bushing that is assembled between shafts or jackets of the steering column. The injection molded plastic telescope bushing functions to take up tolerance variations to reduce lash between the shafts or jackets of the steering column. After the plastic telescope bushing is injection molded, the steering column may be annealed to create a custom fit for each shaft or jacket. The process of injection molding the plastic telescope bushing is expensive, labor-intensive, and may produce large amounts of part scrapping due to variance in preparation.

Accordingly, it is desirable to provide a manufacturing assembly and a method of manufacturing a steering shaft assembly to overcome the deficiencies of the injection molding and annealing while taking up tolerance variations.

SUMMARY OF THE INVENTION

According to an embodiment of the present disclosure, a method of manufacturing a steering shaft assembly is provided. The method includes providing an inner shaft and an outer shaft. The method further includes heating the inner shaft and the outer shaft. The method still further includes applying a plastic coating to at least a portion of the inner shaft and cooling the inner shaft having the plastic coating for a predetermined time. The method also includes pressing the outer shaft and the inner shaft together in response to the outer shaft achieving a predetermined temperature.

According to another embodiment of the present disclosure, a method of manufacturing a steering shaft assembly is provided. The method includes heating an inner shaft and an outer shaft and applying a plastic coating to at least a portion of the inner shaft. The method further includes cooling the plastic coating and pressing the outer shaft and the inner shaft together.

According to another embodiment of the present disclosure, a steering shaft assembly is provided. The steering shaft assembly is assembled by a process including the steps of heating an inner shaft having an externally splined portion and heating an outer shaft having an internally splined portion. The steps further include coating at least one of the externally splined portion and the internally splined portion with a plastic coating and mist quenching the plastic coating, prior to immediate assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative examples of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
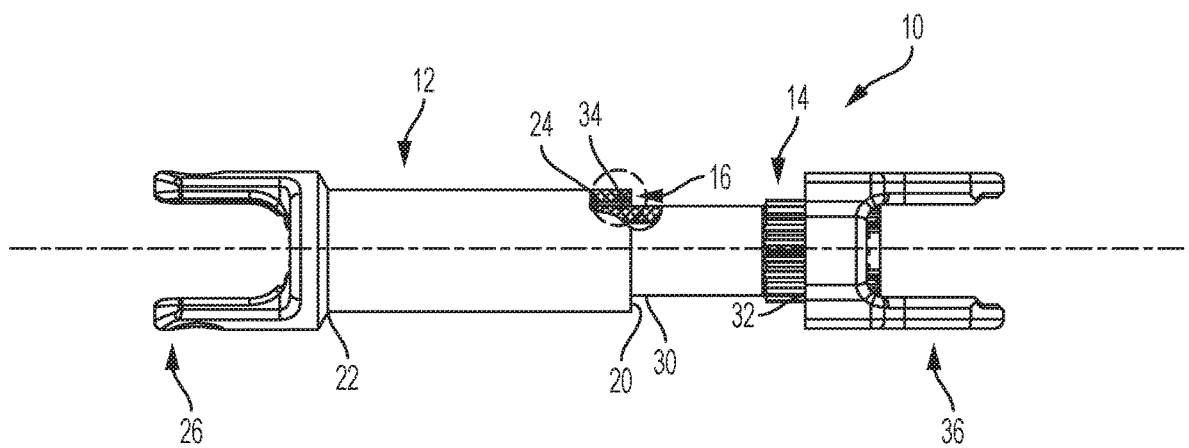
FIG. 1 is a side view of a steering shaft assembly.

Referring to FIG. 1, a steering shaft assembly 10 includes an outer shaft 12, an inner shaft 14, and a sliding/rolling interface 16.

The outer shaft 12 is a generally tubular body that extends between an outer shaft first end 20 and an outer shaft second end 22. An internal surface of the generally tubular body of the outer shaft 12 defines an internally splined portion 24 that extends from the outer shaft first end 20 towards the outer shaft second end 22. The outer shaft second end 22 includes a yoke or an attachment member 26 that is arranged to connect the outer shaft second end 22 of the outer shaft 12 to other components of a steering assembly.

The inner shaft 14 may be a hollow shaft or a solid shaft that extends between an inner shaft first end 30 and an inner shaft second end 32. An external surface of the inner shaft 14 defines an externally splined portion 34 that extends from the inner shaft first end 30 towards the inner shaft second end 32. The inner shaft second end 32 includes another yoke or another attachment member 36 that is arranged to connect the inner shaft second end 32 of the inner shaft 14 to other components of the steering assembly.

The inner shaft 14 is at least partially received within the outer shaft 12. The inner shaft first end 30 is at least partially received by the outer shaft first end 20 such that the externally splined portion 34 of the inner shaft 14 engages with the internally splined portion 24 of the outer shaft 12. The inner shaft 14 is arranged to telescope along a longitudinal axis 40 relative to the outer shaft 12 and is arranged to rotate with the outer shaft 12.

The sliding/rolling interface 16 is disposed between the external surface of the inner shaft 14 and the internal surface of the generally tubular body of the outer shaft 12. More specifically, the sliding/rolling interface 16 is disposed about at least one of the internally splined portion 24 of the outer shaft 12 or the externally splined portion 34 of the inner shaft 14.

The sliding/rolling interface 16 is configured as a plastic component such as a bushing that is directly attached to at least one of the internally splined portion 24 of the outer shaft 12 or the externally splined portion 34 of the inner shaft 14. The plastic component is applied to at least one of the internally splined portion 24 of the outer shaft 12 or the externally splined portion 34 of the inner shaft 14 using a manufacturing process supported by a manufacturing assembly.

The manufacturing assembly is arranged to manufacture the steering shaft assembly 10 having the outer shaft 12, the inner shaft 14, and the sliding/rolling interface 16. The manufacturing assembly includes at least a load station, a robot/automated pick and place system, a heat up station, a coating station, a cooling station, and an assembly station.

The load station is configured to receive the outer shaft 12 and the inner shaft 14. The loading station provides the outer shaft 12 and the inner shaft 14 to the robot.

The robot includes a robotic arm that is configured to move the outer shaft 12 and/or the inner shaft 14 between various stations of the manufacturing assembly.

The heat up station is arranged to heat or preheat at least a portion of the outer shaft 12 and the inner shaft 14. The heat up station includes a thermal fixture such as a preheat oven having a first heater block and a second heater block.

The coating station includes a fluidized bed or an electrostatic spray configured to apply a plastic coating to at least one of the outer shaft 12 and the inner shaft 14.

The cooling station is configured to quench the plastic coating and/or at least one of the outer shaft 12 and the inner shaft 14.

The assembly station is arranged to join the outer shaft 12 and the inner shaft 14 together. The assembly station includes a press having press load monitoring features and steering shaft length monitoring features. In at least one embodiment, the assembly station includes a phase/orientation monitoring feature to ensure correct alignment between the outer shaft 12 and the inner shaft 14.

Figure 2:
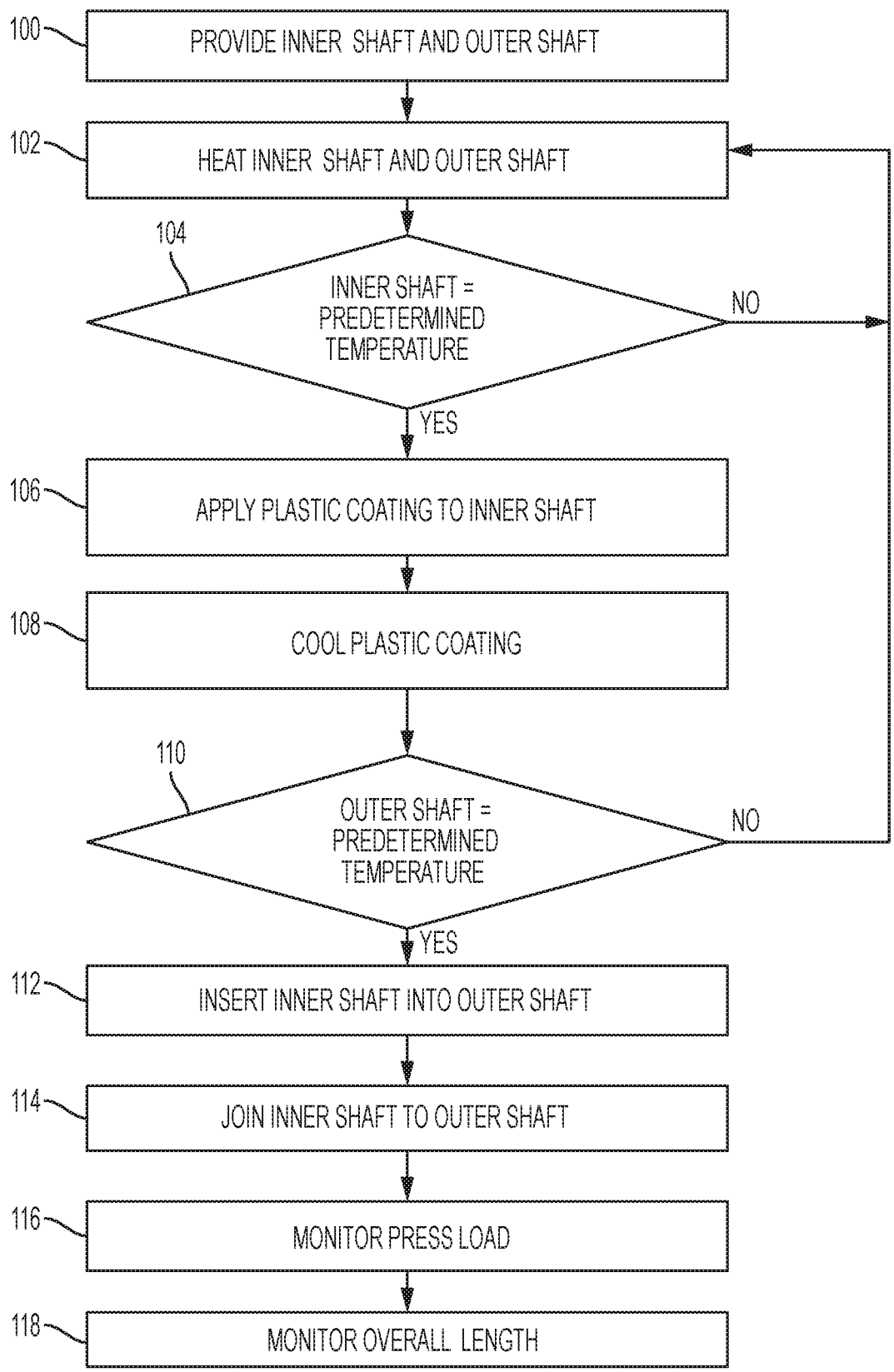
FIG. 2 is a flowchart of an illustrative method of manufacturing a steering shaft assembly.

Referring to FIG. 2, an illustrative method of manufacturing a steering shaft assembly using at least a portion of the manufacturer assembly is shown.

At block 100 the outer shaft 12 and the inner shaft 14 are provided at the load station. The outer shaft 12 is moved to the heat up station and is inserted into the preheat oven. The inner shaft 14 is moved to and is inserted into the heat up station.

At block 102, the outer shaft 12 and the inner shaft 14 are heated by the preheat oven. The outer shaft 12 and the inner shaft 14 are substantially simultaneously heated within the preheat oven. The inner shaft 14 is heated using a first heater block and the outer shaft 12 is heated using a second heater block.

At block 104, in response to the inner shaft 14 at least achieving a predetermined temperature, the inner shaft 14 is removed from the preheat oven and is moved to the coating station. In at least one embodiment, in response to the outer shaft 12 achieving a predetermined temperature, the outer shaft 12 is removed from the preheat oven and is moved to the coating station.

At block 106, a plastic coating is applied to at least a portion of the externally splined portion 34 of the inner shaft 14. The plastic coating is applied to at least a portion of the externally splined portion 34 of the inner shaft 14 by dipping or inserting the inner shaft 14 into the fluidized bed. The fluidized bed is provided with a powderized or fluidized version of the plastic. The inner shaft 14 is dipped or inserted in the fluidized bed for predetermined time period such that the plastic melts and adheres to at least the externally splined portion 34 of the inner shaft 14. In at least one embodiment, the outer shaft 12 is dipped or inserted into the fluidized bed for a predetermined time period such that the plastic melts adheres to at least the internally splined portion 24 of the outer shaft 12. The inner shaft 14 having the plastic coating is moved to the cooling station.

At block 108, while at the cooling station, the portion of the inner shaft 14 having the plastic coating is cooled by mist quenching for a predetermined time period. The mist quenching applies an atomized fluid or mist to the plastic coating to quickly cool the plastic coating such that a surface of the plastic coating at least partially solidifies while the remaining plastic coating between the surface and the external surface of the inner shaft 14 remains soft. The mist quenching enables accelerated creeping of the plastic coating during the joining step. In at least one embodiment, the outer shaft 12 having a plastic coating is moved to the cooling station and is mist quenched. In at least one embodiment, the portion of the inner shaft 14 having the plastic coating is cooled by ambient air or forced air for a first predetermined time period and is then quenched by mist quenching the portion of the inner shaft 14 having the plastic coating for a second predetermined time, that is different from the first predetermined time.

The inner shaft having the plastic coating is moved to the assembly station. The outer shaft 12 is moved to the assembly station, in response to the outer shaft 12 obtaining a predetermined temperature.

At block 110, in response to the outer shaft 12 achieving a predetermined temperature, the outer shaft 12 is removed from the preheat oven and moved to the assembly station.

At block 112, while at the assembly station, the inner shaft 14 is inserted into the outer shaft 12, such that the externally splined portion 34 of the inner shaft 14 is received by the internally splined portion 24 of the outer shaft 12. The receiving of the inner shaft 14 within the outer shaft 12 disposes the plastic coating between the externally splined portion 34 of the inner shaft 14 and the internally splined portion 24 of the outer shaft 12.

At block 114, the outer shaft 12 and the inner shaft 14 are joined together by pressing using the press while the inner shaft 14 and the outer shaft 12 are still hot (i.e. proximate their respective predetermined temperatures).

At block 116, the method monitors a press load applied to at least one of the outer shaft 12 and the inner shaft 14. The press load is monitored to ensure a post-anneal stroke effort and torsional stiffness of the resulting steering shaft assembly 10.

At block 118, the method monitors or measures an overall length of the steering shaft assembly 10. The overall length of the steering shaft assembly 10 is monitored to ensure that a predetermined overall steering shaft length is obtained.

The residual heat within the outer shaft 12 and the inner shaft 14 allows the shafts to anneal the plastic coating as the shafts cool. As the plastic coating anneals the sliding/rolling interface 16 or bushing results. As the parts cool (e.g. the outer shaft 12, the inner shaft 14, and the sliding/rolling interface 16) a line-to-line fit is created between the plastic coating of the coated shaft and the non-coated shaft, such that there is no gap and no interference between the external surface of the inner shaft 14 and the internal surface of the outer shaft 12. The line-to-line fit between the external surface of the inner shaft 14 and the internal surface of the outer shaft 12 provides a substantially consistent stroke load during telescopic movement of the outer shaft 12 and the inner shaft 14. The substantially consistent stroke load during telescopic movement reduces stroke effort, i.e. the force required to move the outer shaft 12 relative to the inner shaft 14 or vice versa.

The application of the plastic coating to at least one of the outer shaft 12 and the inner shaft 14 using the manufacturing assembly performing the method of manufacturing outlined above eliminates the need for an annealing oven and allows for a single piece part flow, thus reducing a scrap rate. The manufacturing assembly and the method of manufacturing decreases the total cycle time because the steering shaft assembly 10 is completed as the inner shaft 14 and the outer shaft 12 are pressed together having the sliding/rolling interface 16 between them. There is also a reduction in the total cost of the steering shaft assembly 10 because the outer shaft 12 and the inner shaft 14 are assembled and annealed during the same step eliminates the need to move the parts to an annealing oven and then perform a stroke check machine on an automated line. Furthermore, the number of operators utilized to perform the assembly and manufacturing of the steering shaft assembly 10 is reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A method of manufacturing a steering shaft assembly, comprising:
    providing an inner shaft;
    heating the inner shaft;
    providing an outer shaft;
    heating the outer shaft;
    applying a plastic coating to at least a portion of the inner shaft with an electrostatic spraying process;
    cooling the inner shaft having the plastic coating for a predetermined time;
    in response to the outer shaft achieving a predetermined temperature and the inner shaft being cooled for a predetermined time, pressing the outer shaft and the inner shaft together;
    forming a line-to-line fit between the plastic coating on the at least one portion of the inner shaft and the outer shaft; and
    wherein cooling the inner shaft with the plastic coating includes mist quenching the plastic coating until a surface of the plastic coating at least partially solidifies while the remaining plastic coating between the surface and the inner shaft remains soft.

2. The method of claim 1, wherein pressing the outer shaft and the inner shaft together, includes:
    inserting the inner shaft at least partially into the outer shaft;
    applying a press load to at least one of the outer shaft and the inner shaft; and
    monitoring the press load.

3. The method of claim 2, wherein applying the press load to at least one of the outer shaft and the inner shaft includes pressing the outer shaft and the inner shaft together to a predetermined overall steering shaft length.

4. The method of claim 1, wherein cooling the plastic coating includes misting the plastic coating with a fluid.

5. The method of claim 1, wherein the step of pressing the outer shaft and the inner shaft together includes utilizing residual heat from the inner shaft and the outer shaft to anneal the plastic coating.

6. The method of claim 1, wherein cooling the inner shaft with the plastic coating further includes initially cooling the plastic coating with one of ambient air or forced air before the mist quenching.

7. The method of claim 1, including forming a second plastic coating on the outer shaft before forming the line-to-line fit.

8. A method of manufacturing a steering shaft assembly, comprising:
    heating an inner shaft and an outer shaft;
    applying a plastic coating to at least a portion of the inner shaft with an electrostatic spraying process;
    cooling the plastic coating, wherein cooling the plastic coating includes mist quenching the plastic coating until a surface of the plastic coating at least partially solidifies while the remaining plastic coating between the surface and the inner shaft remains soft;
    in response to the plastic coating being cooled, pressing the outer shaft and the inner shaft together; and
    forming a line-to-line fit between the plastic coating on the at least one portion of the inner shaft and the outer shaft.

9. The method of claim 8, wherein cooling the plastic coating includes mist quenching the plastic coating.

10. A method of manufacturing a steering shaft assembly, comprising:
    providing an inner shaft;
    heating the inner shaft;
    providing an outer shaft;
    heating the outer shaft;
    applying a plastic coating to at least a portion of the inner shaft with an electrostatic spraying process;
    cooling the inner shaft having the plastic coating for a predetermined time;
    in response to the outer shaft achieving a predetermined temperature and the inner shaft being cooled for a predetermined time, pressing the outer shaft and the inner shaft together;
    forming a line-to-line fit between the plastic coating on the at least one portion of the inner shaft and the outer shaft; and
    forming a second plastic coating on the outer shaft before forming the line-to-line fit.

* * * * *